(12) United States Patent
Okada

(10) Patent No.: US 6,636,791 B2
(45) Date of Patent: Oct. 21, 2003

(54) COLLISION RECORD APPARATUS, COLLISION STATE ESTIMATION METHOD, AND RECORD MEDIUM

(75) Inventor: Takeo Okada, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/033,791

(22) Filed: Jan. 3, 2002

(65) Prior Publication Data

US 2002/0091474 A1 Jul. 11, 2002

(30) Foreign Application Priority Data

Jan. 5, 2001 (JP) ..................... P. 2001-000729

(51) Int. Cl.⁷ ............................. G06F 7/00; G06F 19/00
(52) U.S. Cl. .................. 701/35; 180/282; 702/141; 701/47; 701/45; 360/5; 360/45; 360/47
(58) Field of Search .......................... 701/35, 1, 45–47, 701/70; 340/438, 435, 429, 436, 70; 342/129, 133, 165; 180/274, 169, 282; 702/141; 280/735; 360/5, 45, 47

(56) References Cited

U.S. PATENT DOCUMENTS

| | | | |
|---|---|---|---|
| 4,992,943 A | | 2/1991 | McCracken .................. 701/35 |
| 5,440,485 A | * | 8/1995 | Okimoto et al. .............. 701/46 |
| 5,477,141 A | | 12/1995 | Nather et al. ................ 324/160 |
| 6,064,970 A | * | 5/2000 | McMillan et al. ............. 705/4 |
| 6,243,633 B1 | | 6/2001 | Kanameda et al. ........... 701/45 |
| 6,253,149 B1 | | 6/2001 | Wannke ...................... 701/208 |
| 6,266,588 B1 | * | 7/2001 | McClellan et al. ........... 701/35 |
| 6,360,147 B1 | * | 3/2002 | Lee ............................. 701/35 |
| 2002/0016658 A1 | * | 2/2002 | Imai et al. .................... 701/45 |
| 2002/0087235 A1 | * | 7/2002 | Aga et al. ...................... 701/1 |

FOREIGN PATENT DOCUMENTS

| | | |
|---|---|---|
| DE | 199 41 506 | 3/2000 |
| JP | 5-270352 | 10/1993 |
| WO | 98/15922 | 4/1998 |
| WO | 98/47109 | 10/1998 |

* cited by examiner

Primary Examiner—Thomas G. Black
Assistant Examiner—Ronnie Mancho
(74) Attorney, Agent, or Firm—Foley & Lardner

(57) ABSTRACT

A collision recording apparatus records times in a memory, when a collision waveform provided accompanying a collision of a mobile unit and a waveform derived from the collision waveform reach predetermined values. The collision recording apparatus also records waveform types in association with the times, respectively.

8 Claims, 4 Drawing Sheets

| FAILURE CONTNENTS 1 | FAILURE TIMER VALUE |
|---|---|
| FAILURE CONTNENTS 2 | FAILURE TIMER VALUE |
| ⋮ | ⋮ |
| MAXIMUM ACCELERATION | |
| ACCELERATION TIMER VALUE | |

COLLISION RECORD APPARATUS, COLLISION STATE ESTIMATION METHOD, AND RECORD MEDIUM

BACKGROUND OF THE INVENTION

1. Field of the Invention

This invention relates to a collision record apparatus, a collision state estimation method and a record medium for recording the state of a vehicle when a collision of the vehicle occurs.

2. Description of the Related Art

JP-A-5-270352 discloses a collision record apparatus. As shown in FIG. 4, a microcomputer 1 has an operation control section of an air bag and a diagnosis section. The operation control section makes a collision judgment based on a detection output from an acceleration sensor 6. The diagnosis section detects a failure of an acceleration switch 2, a squib 3, etc., by turning on and off a transistor 4 for an extremely short time. The diagnosis section measures the elapsed time since occurrence of the failure (or equivalent state) and then writes the failure contents and the elapsed time since occurrence of the failure into nonvolatile memory 5.

The microcomputer 1 detects the maximum value of the acceleration sensed by the acceleration sensor 6 as a magnitude of a collision. The microcomputer 1 measures the elapsed time since the acceleration reached the maximum (timer value) and then writes the maximum acceleration and the elapsed time into the nonvolatile memory 5 (see FIG. 5).

Consequently, after the collision, the relative time relationship between the failure occurrence and the collision occurrence can be estimated precisely based on the record contents read from the nonvolatile memory 5 (see FIG. 5), namely, the elapsed time. At the same time, the failure contents and the collision degree can also be grasped, making it easy to track down the relationship between the operation state of the air bag and the failure of the operation control section of the air bag.

The collision record apparatus writes the maximum acceleration and the elapsed time into the nonvolatile memory 5 and after the collision, keeps track of the collision state based on the maximum acceleration and the elapsed times in the nonvolatile memory 5. However, upon occurrence of a vehicle collision, it is difficult to make an assumption about the details of the vehicle collision based on a record of one data of the maximum acceleration and the elapsed time, since the waveform of the acceleration drastically varies. In general, this kind of apparatus provides less data indicating the state in which the vehicle collides and is broken, and it is not necessarily easy to track down the cause of the accident.

On the other hand, to solve the problem, it is also considered that acceleration data actually occurring at the collision time is not processed and is stored in memory as waveform data. However, to put the idea to use, for example, memory of a large capacity of at least about several mega bytes becomes necessary, leading to a drastic increase in cost and the idea is not practical; this is a problem.

SUMMARY OF THE INVENTION

It is therefore an object of the invention to record data indicating the feature point when a vehicle collides and is broken, and to make it easy to track down the cause of the collision with a small memory capacity.

According to the invention, there is provided a collision record apparatus for recording times at which a collision waveform provided accompanying a collision of a mobile unit and a waveform derived from the collision waveform reach their respective setup threshold values and waveform types in memory in association with each other.

In the collision record apparatus according to the invention, the time is the elapsed time from the time at which the collision waveform exceeded a predetermined reference value to the time at which the waveform reached the setup threshold value.

According to the invention, there is provided a record medium recording the times at which a collision waveform provided accompanying a collision of a mobile unit and a waveform derived from the collision waveform reach predetermined values in memory in association with waveform types.

According to the invention, there is provided a collision estimation method comprising the steps of starting time counting based on the timing at which a collision waveform provided accompanying a collision exceeds a predetermined reference value, calculating the time when a waveform derived from the collision waveform exceeds a predetermined threshold value set for the waveform based on the counted time, recording the calculated time in a record medium in association with the waveform type, then reading the time recorded on the record medium for each waveform type as required, comparing the read contents with provided experimental measurement data, and estimating a situation when the collision occurred.

BRIEF DESCRIPTION OF THE DRAWINGS

FIG. 2D is an enlarged view of FIG. 2B with respect to the vertical axis thereof.

FIG. 3D is an enlarged view of FIG. 3B with respect to the vertical axis thereof.

DETAILED DESCRIPTION OF THE PRESENT INVENTION

Referring now to the accompanying drawings, there is shown a preferred embodiment of the invention. Signal processing with a microcomputer is equivalent to that with hardware and therefore signal processing with hardware will be discussed.

Embodiment 1

Figure 1:
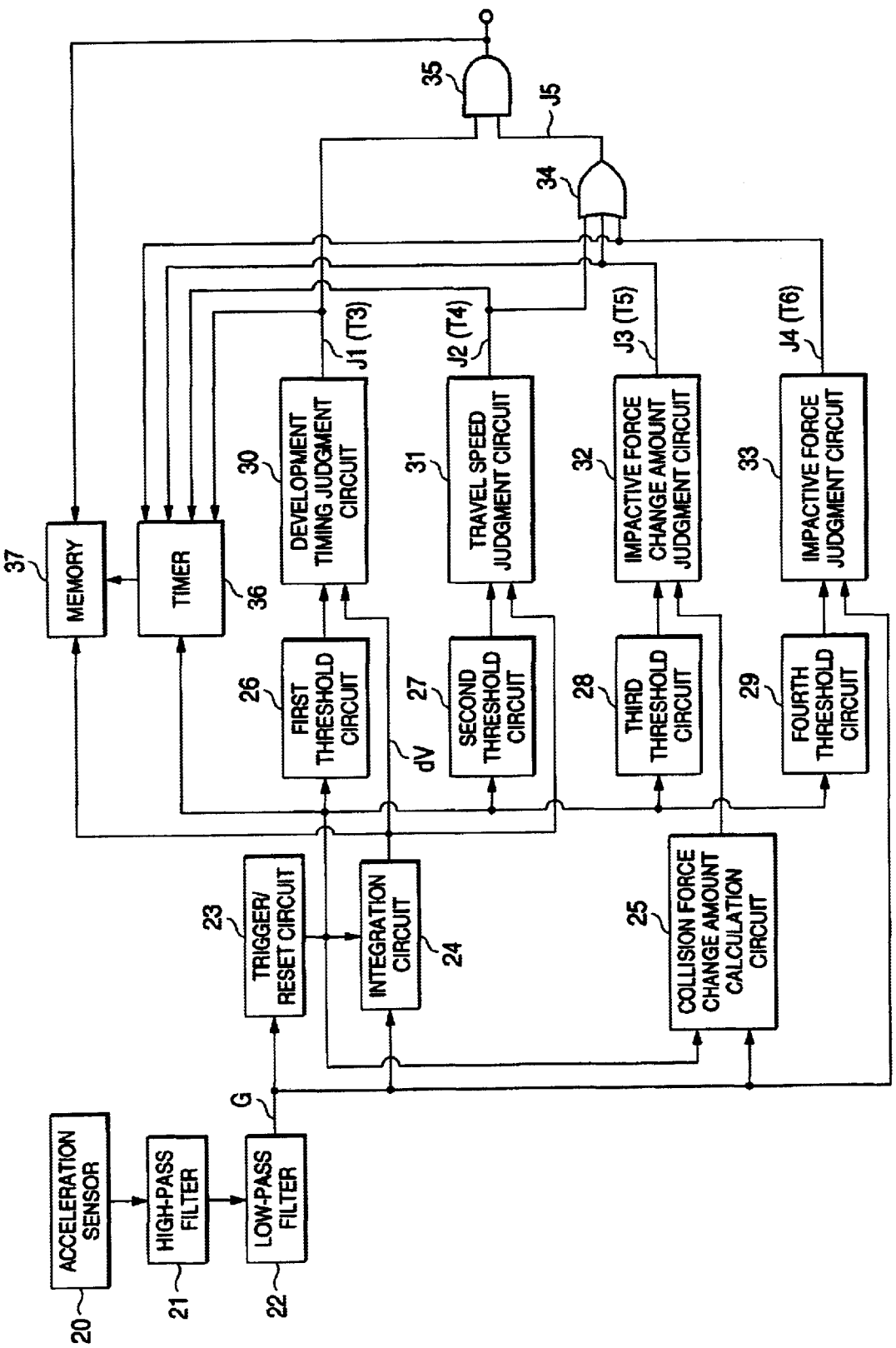
FIG. 1 is a block diagram of circuitry to describe a first embodiment of the invention.

In FIG. 1, an acceleration sensor 20 detects acceleration occurring in a back and forth direction of a vehicle and supplies an acceleration signal G (indicated by the solid line in FIG. 2A) in parallel to a trigger/reset circuit 23, an integration circuit 24, a collision force change amount calculation circuit 25, and an impactive force judgment circuit 33 through a high-pass filter 21 and a low-pass filter 22 connected in series to the acceleration sensor 20.

Figure 2A:
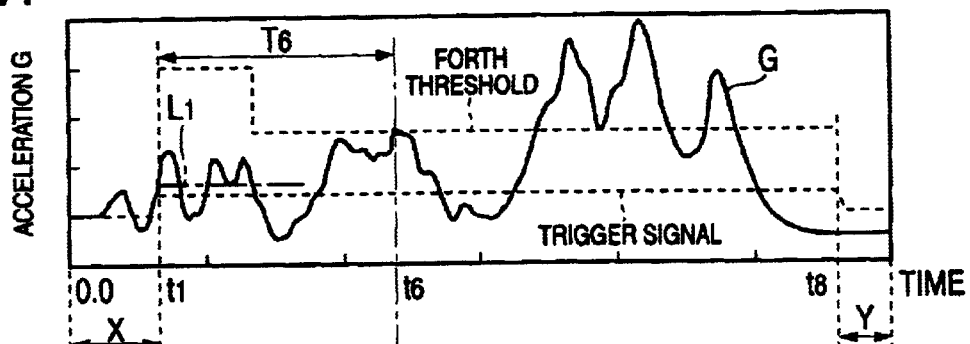
FIGS. 2A to 2D are the first schematic representations of waveforms to describe operation of a collision record apparatus in FIG. 1.

The trigger/reset circuit 23 outputs a trigger signal (indicated by the dashed line in FIG. 2A) which goes into a high-level at time t1 at which the acceleration signal G supplied through the low-pass filter 22 becomes larger than a predetermined reference value L1 and outputs a reset signal low (the falling edge of the trigger signal indicated by the dashed line in FIG. 2A) at time t8 at which the acceleration signal G supplied through the low-pass filter 22 becomes smaller than the predetermined reference value L1 and is maintained in the state for a predetermined time or longer.

When the trigger signal is supplied from the trigger/reset circuit 23, the integration circuit 24 starts integrating the acceleration signal G supplied through the low-pass filter 22 and outputs the integral value of the acceleration signal G. The integral value thereof represents a speed signal dV (indicated by the solid line in FIGS. 2B and 2D).

When the trigger signal is supplied from the trigger/reset circuit 23, the collision force change amount calculation circuit 25 samples the acceleration signal G supplied through the low-pass filter 22 every short time. Then, the collision source change amount calculation circuit 25 finds the difference between the current sampling value and the preceding sampling value and then outputs the integral value of the absolute values of the difference values (indicated by the solid line in FIG. 2C).

Figure 2B:
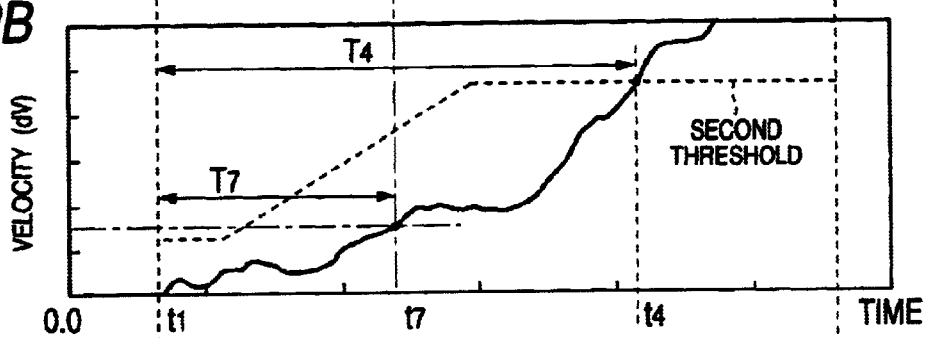
Figure 2C:
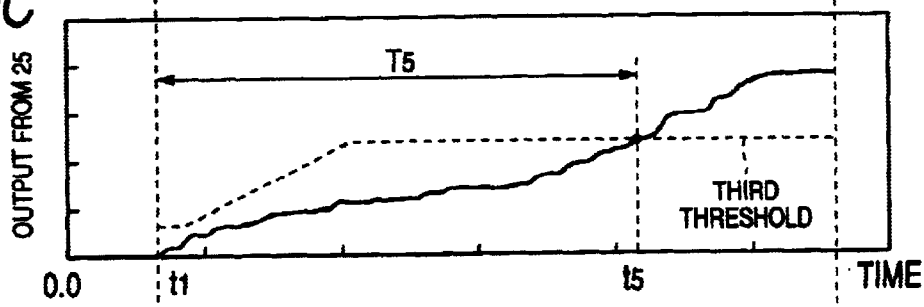
Figure 2D:
Figure 3A:
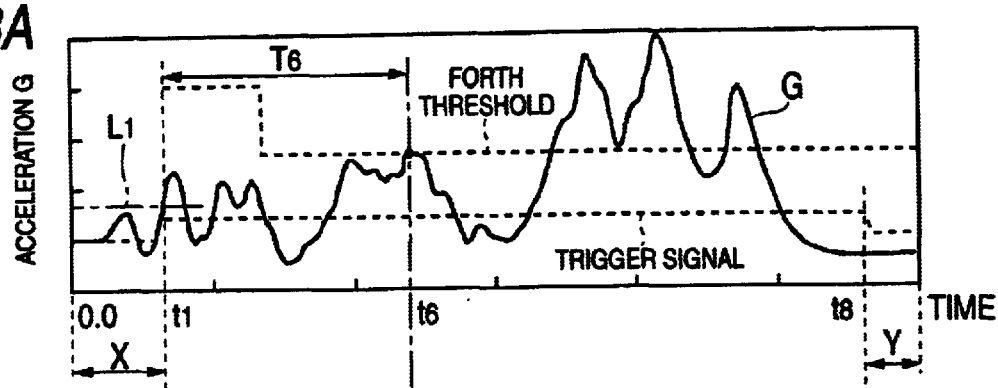
FIGS. 3A to 3D are the second schematic representations of waveforms to describe operation of a collision record apparatus in FIG. 1.
Figure 3B:
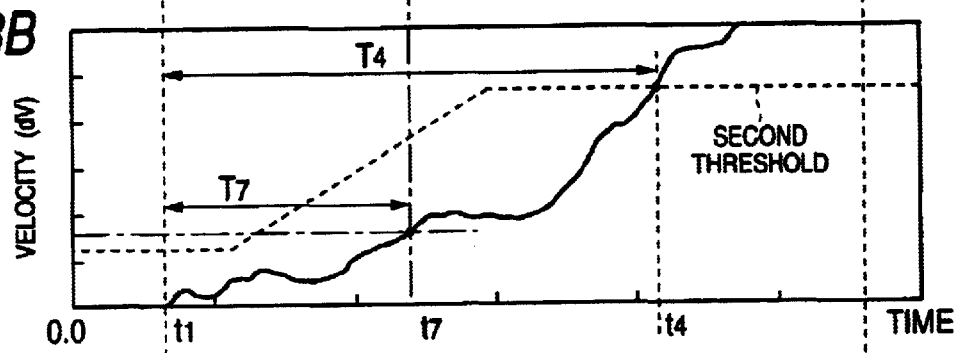
Figure 3C:
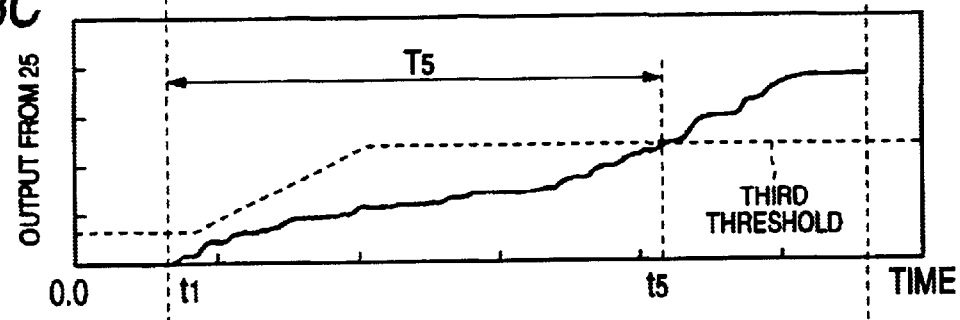
Figure 3D:
Figures 4, 5:
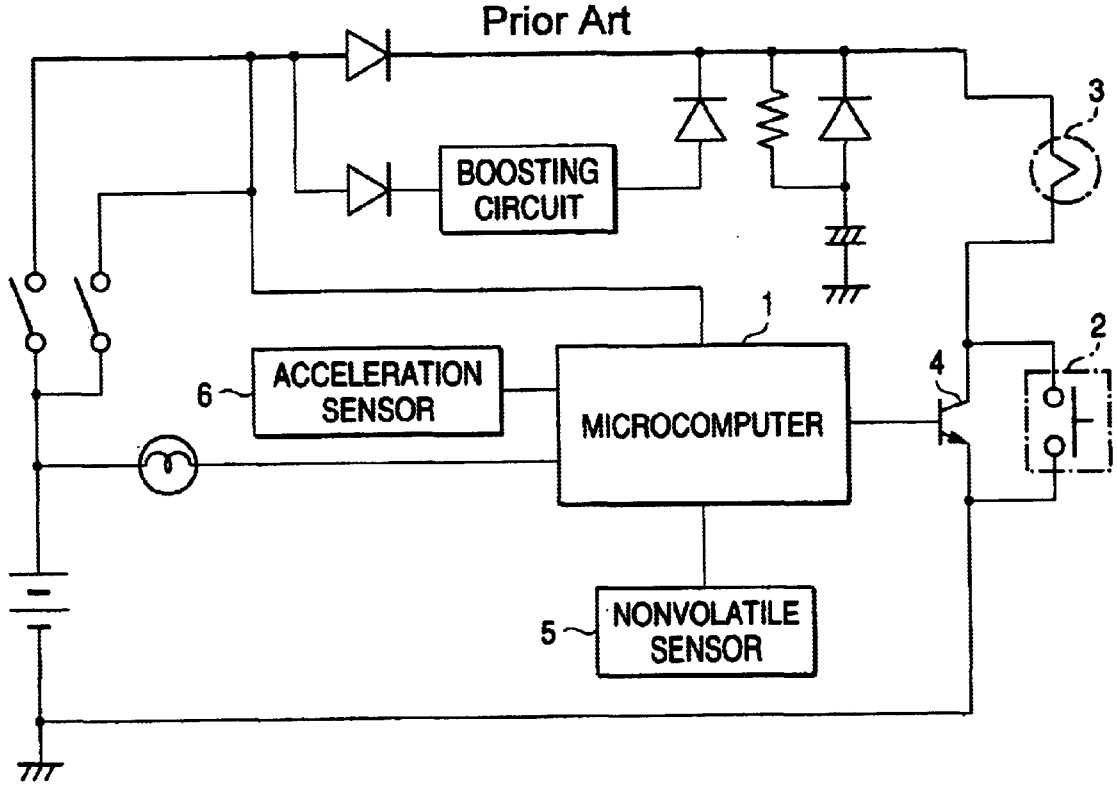
FIG. 4 is a block diagram of circuitry in a related art.
FIG. 5 is a schematic representation to describe record contents stored in memory in FIG. 4.

When the trigger signal is supplied from the trigger/reset circuit 23, a first threshold circuit 26 outputs a first threshold value fixed (indicated by the dashed line in FIG. 2D).

When the trigger signal is supplied from the trigger/reset circuit 23, a second threshold circuit 27 outputs a second threshold value being variable, (indicated by the dashed line in FIG. 2B).

When the trigger signal is supplied from the trigger/reset circuit 23, a third threshold circuit 28 outputs a third threshold value being variable, (indicated by the dashed line in FIG. 2C).

When the trigger signal is supplied from the trigger/reset circuit 23, a fourth threshold circuit 29 outputs a fourth threshold value being variable (indicated by the heavy dashed line in FIG. 2A).

A development timing judgment circuit 30 outputs a high-level first development judgment signal J1 at time t3 at which the speed-signal dV supplied from the integration circuit 24 exceeds the first threshold value (fixed) supplied from the first threshold circuit 26. As shown in FIG. 2D, a period of time T3 is defined by a period from the time t1 to the time t3.

A moving speed judgment circuit 31 outputs a high-level second development judgment J2 signal at time t4 at which the speed signal dV supplied from the integration circuit 24 exceeds the second threshold value (variable) supplied from the second threshold circuit 27. As shown in FIG. 2B, a period of time T4 is defined by a period from the time t1 to the time t4.

An impactive force change amount judgment circuit 32 outputs a high-level third development judgment signal J3 at time t5 at which the output signal supplied from the collision force change amount calculation circuit 25 exceeds the third threshold value (variable) supplied from the third threshold circuit 28. As shown in FIG. 2C, a period of time T5 is defined by a period from the time t1 to the time t5.

The impactive force judgment circuit 33 outputs a high-level fourth development judgment signal J4 at time t6 at which the acceleration signal G supplied through the low-pass filter 22 exceeds the fourth threshold value (variable) supplied from the fourth threshold circuit 29. As shown in FIG. 2A, a period of time T6 is defined from the time t1 to the time t6.

An OR gate 34 outputs a high-level fifth development judgment signal J5 when the high-level signal is supplied from any of the moving speed judgment circuit 31, the impactive force change amount judgment circuit 32, and the impactive force judgment circuit 33.

An AND gate 35 outputs a high-level signal (ignition current) only at time t7 at which the high-level first development judgment signal J1 is supplied from the development timing judgment circuit 30 and the high-level fifth development judgment signal J5 is supplied from the OR gate 34. For example, as shown in FIG. 2B, the time t7 represents when the acceleration signal G exceeds the fourth threshold value. The ignition current output from the AND gate 35 is supplied to a squib (not shown) for developing an air bag. At this time, the speed signal supplied from the integration circuit 24 becomes the value dV (indicated by the alternate long and short dashed line in FIG. 2B). A period of time T7 is defined from the time t1 to the time t7 at which the AND gate 35 outputs the ignition current to the squib. In the embodiment, as shown in FIG. 2A, the period of time T7 is the same as the period of time from the time t1 to the time t6 at which the acceleration signal G exceeds the fourth threshold value.

A timer 36 starts the time count operation based on the timing at which the trigger signal is output from the trigger/reset circuit 23. The timer 36 records the output timing indicated by T3 to T6 and the integral value (speed signal dV) in a memory 37 described just below, for each time that the judgment signal is output from the development timing judgment circuit 30, the moving speed judgment circuit 31, the impactive force change amount judgment circuit 32, or the impactive force judgment circuit 33.

The memory 37 is a writable memory, such as EEPROM, having a record capacity of 1 kilobits. The development timing judgment signals J1 to J4 are supplied to the memory 37 through the timer 36 from the development timing judgment circuit 30, the moving speed judgment circuit 31, the impactive force change amount judgment circuit 32, and the impactive force judgment circuit 33, respectively. In addition, the time periods T3 to T7 are supplied from the timer 36, so that the development timing judgment signals J1 to J4 and the time T3 to T7 are recorded in association with each other. In addition, the memory 37 records the integral value (speed signal dV) output from the integration circuit 24 when the high-level signal is supplied from the AND gate 35.

The operation of the collision record apparatus follows:

When the vehicle collides, the acceleration sensor 20 senses acceleration involved in the collision and supplies an acceleration signal G in parallel to the trigger/reset circuit 23, the integration circuit 24, the collision force change amount calculation circuit 25, and the impactive force judgment circuit 33 through the high-pass filter 21 and the low-pass filter 22.

Upon reception of the acceleration signal G (solid line in FIG. 2A), the trigger/reset circuit 23 outputs a high-level trigger signal (thin dashed line in FIG. 2A) to the integration circuit 24, the collision force change amount calculation circuit 25, the first to fourth threshold circuits 26 to 29, and the timer 36, at time t1 at which the acceleration signal G exceeds the predetermined reference value L1. Then, the integration circuit 24 starts integrating the acceleration signal G supplied through the low-pass filter 22 and outputs a speed signal dV (solid line in FIG. 2B, 2D).

On the other hand, the collision force change amount calculation circuit 25 samples the acceleration signal G supplied through the low-pass filter 22 every short time. Then, the collision force change amount calculation circuit 25 finds the difference between the current sampling value and the previous sampling value that is measured just one before the current measurement and then outputs the integral value of the absolute values of the difference values (indicated by the solid line in FIG. 2C).

The first to fourth threshold circuits 26 to 29 outputs first to fourth threshold signals J1 to J4 respectively.

Consequently, first, the development timing judgment circuit 30 outputs a high-level first development judgment signal J1, when the speed signal dV supplied from the integration circuit 24 exceeds the first threshold value (fixed) supplied from the first-threshold circuit 26 at time t3.

Next, the AND gate 35 outputs a high-level ignition signal to the squib (not shown) for developing an air bag to protect a passenger, when a high-level development judgment signal is supplied to the OR gate 34 from any of the moving speed judgment circuit 31, the impactive force change amount judgment circuit 32, and the impactive force judgment circuit 33.

On the other hand, the timer 36 starts the time counting upon reception of the trigger signal from the trigger/reset circuit 23. Upon each reception of the first to fourth development judgment signals J1 to J4 from the development timing judgment circuit 30, the moving speed judgment circuit 31, the impactive force change amount judgment circuit 32, and the impactive force judgment circuit 33, the timer 36 supplies the time periods T3 to T6 to the memory 37 together with the signals or corresponding signals. In addition, the integral value dV is recorded in the memory 37 at a timing at which the AND gate 35 outputs the high-level ignition current. Consequently, the memory 37 records the first to fourth development judgment signals J1 to J4 and the time periods T3 to T6 that correspond to the first to fourth development judgment signals J1 to J4, respectively. In addition, the integral value (speed signal dV) is also recorded into the memory 37 when the AND gate outputs a high-level ignition signal.

The waveform types is defined as types of waveform, for example, represented by the acceleration signal G, the speed signal dV and the first to fourth development judgment signals J1 to J4, in the embodiment.

Accordingly, after an accident, a third party removes the memory 37 from the collision record apparatus and reads the record contents through a reader (not shown) and then compares the read collision record with provided experimental data, whereby a rough collision mode is clarified.

In the embodiment 1, the first to fourth threshold circuits 26 to 29 set the first to fourth threshold values to be zero-level, respectively, during a period before the trigger/reset circuit 23 outputs the trigger signal (namely from 0 to t1, X period in FIG. 2A) and a period after the reset signal is output (namely after t8, Y period in FIG. 2A). However, the first to fourth threshold values have default values, respectively, as shown in FIGS. 3A to 3D.

As described above, according to one aspect of the invention, only the feature point of each waveform is recorded, so that the memory capacity can be lessened and a practical collision record apparatus and record medium can be provided.

According to another aspect of the invention, the feature point of a collision waveform is recorded and the recorded data is compared with the provided experimental data, whereby the collision situation can be estimated more easily with good accuracy.

In the present invention, the first to fourth development judgment signals J1 to J4 corresponding to the time periods T3 to T6 and the integral value (speed signal dV) are defined as characteristic points. However, the present invention is not limited thereto. The other parameters that characterize the details of collisions may be recorded into the memory.

What is claimed is:

1. A collision record apparatus comprising:

means for judging that a collision waveform due to a collision of a mobile unit and a waveform derived from the collision waveform reach predetermined thresholds, respectively; and means for recording times, at which the collision waveform and the waveform derived therefrom reach the predetermined thresholds, in memory in association with waveform types, wherein the times are elapsed times from a time at which the collision waveform exceeds a reference value to a time at which the collision waveform or waveform derived therefrom reach the threshold value.

2. A record medium recording a computer program and information therein, wherein the information comprises:

times, at which a collision waveform provided accompanying a collision of a mobile unit and a waveform derived from the collision waveform reach predetermined values; and waveform types in association with the times; and wherein the computer program is for performing a method of estimating a collision, the computer program including a plurality of computer executable instructions, wherein the instructions, when executed by the computer, cause the computer to perform the steps of:

reading the times for each of the waveform types as required;

comparing the read contents with provided experimental data; and estimating a situation when the collision occurs.

3. A collision estimation method comprising the steps of:

starting time-counting based on a timing at which a collision waveform provided accompanying a collision exceeds a predetermined reference value;

calculating a time when a waveform derived from the collision waveform exceeds a predetermined threshold value for the waveform based on the counted time;

recording the calculated time in a record medium in association with waveform types;

reading the time recorded on the record medium for each waveform type as required;

comparing the read contents with provided experimental measurement data; and estimating a situation when the collision occurring.

4. A collision record apparatus comprising:

an acceleration sensor for measuring an acceleration signal of a mobile unit upon a collision occurring;

a trigger circuit for outputting a trigger signal according to the acceleration signal received from acceleration sensor;

a threshold circuit for outputting a threshold value in response to reception of the trigger signal;

a judgment circuit for outputting an judgment signal upon exceeding the threshold value;
a timer for counting a time period from the output of the trigger signal to the output of the judgment signal; and
a memory for recording the judgment signal and the time.

5. The collision record apparatus as claimed in claim 4, wherein the trigger circuit outputs the trigger signal when the acceleration exceeds a predetermined value.

6. The collision record apparatus as claimed in claim 4, wherein an airbag is developed according to the judgment signal.

7. The collision record apparatus as claimed in claim 4, further comprising a calculation circuit for performing a calculation based on the acceleration signal to generate a calculated signal, the calculation circuit for outputting a calculated signal to the judgment circuit.

8. The collision record apparatus as claimed in claim 7, wherein the judgment circuit judges that the calculated signal exceeds the threshold value.

* * * * *